US011123660B2

(12) United States Patent
Divers, III

(10) Patent No.: US 11,123,660 B2
(45) Date of Patent: Sep. 21, 2021

(54) ASH MANAGEMENT TRENCH

(71) Applicant: CHARAH, LLC, Louisville, KY (US)

(72) Inventor: Norman E. Divers, III, Belmont, NC (US)

(73) Assignee: Charah, LLC, Louisville, KY (US)

( * ) Notice: Subject to any disclaimer, the term of this patent is extended or adjusted under 35 U.S.C. 154(b) by 59 days.

(21) Appl. No.: 16/266,539

(22) Filed: Feb. 4, 2019

(65) Prior Publication Data

US 2019/0168136 A1 Jun. 6, 2019

Related U.S. Application Data

(63) Continuation of application No. 14/813,052, filed on Jul. 29, 2015, now Pat. No. 10,195,546.

(Continued)

(51) Int. Cl.
    *B01D 21/24* (2006.01)
    *B01D 21/00* (2006.01)
    (Continued)

(52) U.S. Cl.
    CPC ......... *B01D 21/24* (2013.01); *B01D 21/0003* (2013.01); *B01D 21/0012* (2013.01); *B01D 21/01* (2013.01); *B03D 3/00* (2013.01); *B09B 1/00* (2013.01); *C02F 1/56* (2013.01); *B09B 2220/06* (2013.01); *C02F 2001/007* (2013.01); *C02F 2101/10* (2013.01); *C02F 2101/20* (2013.01); *C02F 2103/18* (2013.01); *C02F 2103/34* (2013.01); *C04B 18/06* (2013.01); *E02B 7/22* (2013.01); *E02B 8/06* (2013.01)

(58) Field of Classification Search
    CPC ...... B01D 21/24; B01D 21/0003; B09B 1/00; B09B 2220/06; B03D 3/00; C02F 1/56; C02F 2101/20; C02F 2101/10; C02F 2001/007; C02F 2103/18; C02F 2103/34; E02B 7/22; E02B 8/06; C04B 18/06
    See application file for complete search history.

(56) References Cited

U.S. PATENT DOCUMENTS

| 622,423 | A | * | 4/1899 | Greig | ................. | B01D 21/0012 |
|---|---|---|---|---|---|---|
| | | | | | | 210/260 |
| 623,828 | A | * | 4/1899 | Riensch | .................... | E03F 5/14 |
| | | | | | | 210/155 |

(Continued)

FOREIGN PATENT DOCUMENTS

FR 944883 A 4/1949

OTHER PUBLICATIONS

Merriam-Webster-terms (Year: 2021).*
English language translation of French Patent No. 944883 A issued to Caquot on Apr. 19, 1949.

*Primary Examiner* — Liam Royce
(74) *Attorney, Agent, or Firm* — Moore & Van Allen PLLC; Henry B. Ward, III

(57) ABSTRACT

An ash management trench system is provided for harvesting byproducts from sluice water, such as a discharge from a power plant. The system comprises a first section comprising at least one flow control structure. The at least one flow structure is typically configured to capture a predetermined byproduct. The system further comprises a second section comprising a stilling basin. The second section is coupled to the first section by a connection structure.

21 Claims, 6 Drawing Sheets

Related U.S. Application Data

(60) Provisional application No. 62/030,433, filed on Jul. 29, 2014.

(51) Int. Cl.
| | | |
|---|---|---|
| *B01D 21/01* | (2006.01) | |
| *B09B 1/00* | (2006.01) | |
| *B03D 3/00* | (2006.01) | |
| *C02F 1/56* | (2006.01) | |
| *E02B 7/22* | (2006.01) | |
| *E02B 8/06* | (2006.01) | |
| *C04B 18/06* | (2006.01) | |
| *C02F 1/00* | (2006.01) | |
| *C02F 101/20* | (2006.01) | |
| *C02F 103/18* | (2006.01) | |
| *C02F 103/34* | (2006.01) | |
| *C02F 101/10* | (2006.01) | |

(56) References Cited

U.S. PATENT DOCUMENTS

| | | | |
|---|---|---|---|
| 2,573,905 | A | 11/1951 | Hapman |
| 3,115,148 | A * | 12/1963 | Algot .................. E03F 1/00 137/205 |
| 3,981,541 | A | 9/1976 | Doerr et al. |
| 4,040,852 | A | 8/1977 | Jones |
| 4,212,682 | A | 7/1980 | Burkett |
| 4,352,593 | A | 10/1982 | Iskra et al. |
| 4,388,195 | A * | 6/1983 | von Hagel ........... B01D 21/245 210/709 |
| 4,934,868 | A | 6/1990 | Hellstrom et al. |
| 5,082,572 | A | 1/1992 | Schmidt |
| 5,857,807 | A | 1/1999 | Longo, Sr. |
| 7,494,592 | B2 * | 2/2009 | Deskins ............ B01D 21/0012 210/694 |
| 2006/0229486 | A1 | 10/2006 | Muther |
| 2014/0069867 | A1 | 3/2014 | Rennard et al. |

\* cited by examiner

FLOW CONTROL STRUCTURE DETAILS

ASH MANAGEMENT TRENCH

CROSS-REFERENCE TO RELATED APPLICATIONS

This application is a continuation of U.S. patent application Ser. No. 14/813,052 for an "ASH MANAGEMENT TRENCH," filed on Jul. 29, 2015, which itself claims the benefit of U.S. Provisional Patent Application No. 62/030,433 filed Jul. 29, 2014. Both of the foregoing patent applications are hereby incorporated by reference in their entirety.

BACKGROUND

When coal is burned, recyclable byproducts may be produced. Hence, there is a need to safely and efficiently harvest these byproducts for reuse.

BRIEF SUMMARY

Embodiments of the invention comprise an ash management trench. The purpose of the ash management trench is to provide a safe and efficient process for harvesting steam production byproducts from sluice water (discharge water from a power plant). The ash management trench receives the sluice water, separates the byproducts from the sluice water, and allows for the excavation of the byproducts. Once harvested, these byproducts may be recycled or sold for reuse.

In some embodiments, an ash management trench system for harvesting byproducts is provided, the system comprising: a first section comprising at least one flow control structure; and a second section comprising a stilling basin, the second section coupled to the first section.

In some embodiments, the system further comprises a casting area.

In some embodiments, the system further comprises a separator dam.

In some embodiments, the system further comprises a geotextile layer.

In some embodiments, the system further comprises at least one textured surface.

In some embodiments, the system further comprises at least one of a drain, a pipe, or a pump.

In some embodiments, the system further comprises a flexible high density polyethylene membrane liner.

In some embodiments, the system defines at least one of a length, a width, a surface area, a depth, or a volume.

In some embodiments, the system is constructed with concrete.

In some embodiments, the system is at least one of sloped, elevated, tiered, or inclined.

In some embodiments, the first section comprises a receiving channel.

In some embodiments, the first section comprises a headwall.

In some embodiments, the headwall comprises an opening for receiving sluice water.

In some embodiments, the first section comprises the addition of at least one flocculant.

In some embodiments, the flocculant comprises anionic polyacrylamide.

In some embodiments, the at least one flow control structure comprises at least one of a stop log system, a mesh wire fence, or a solid wall.

In some embodiments, the stilling basin defines at least one zone, the at least one zone comprising at least one designated area for ash settlement.

In some embodiments, the first section and the second section are coupled in series.

In some embodiments, an ash management trench system for harvesting byproducts is provided, the system comprising: a first section comprising at least one flow control structure, the at least one flow control structure comprising the addition of at least one flocculant; a second section comprising a stilling basin, the second section coupled to the first section in series; a casting area, the casting area comprising a collection drain; and a protective geotextile layer adjacently coupled to the first section and the second section.

In some embodiments, an ash management trench method for harvesting byproducts is provided, the method comprising: a first section comprising at least one flow control structure; providing a second section comprising a stilling basin, the second section coupled to the first section in series; receiving sluice water via a headwall in the first section, the sluice water comprising byproducts; transporting the sluice water through the first section and into the second section via the at least one flow control structure, the second section enabling the settlement of byproducts; and transporting the settled byproducts to a casting area.

BRIEF DESCRIPTION OF THE DRAWINGS

Figure 1:
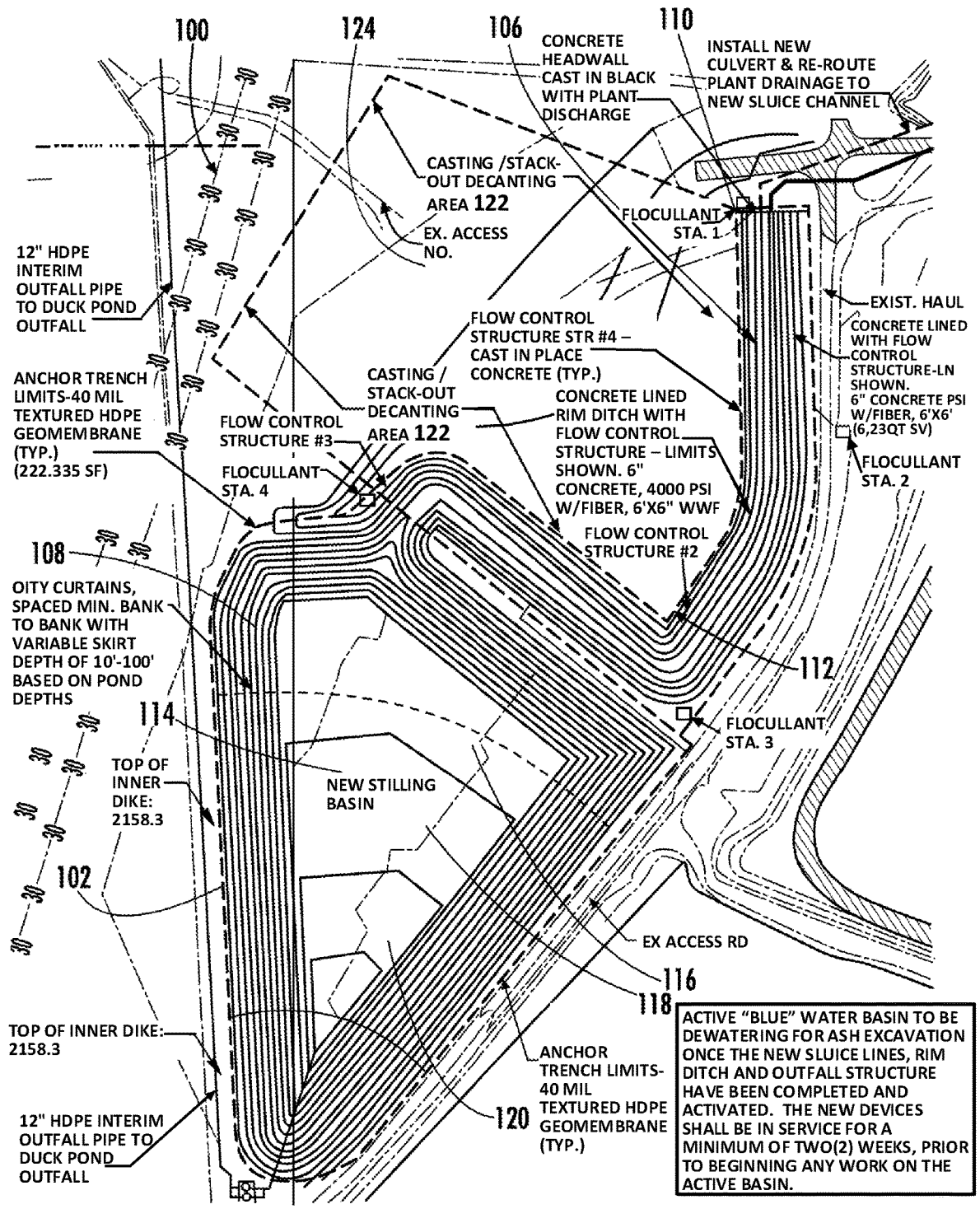
Figure 2:
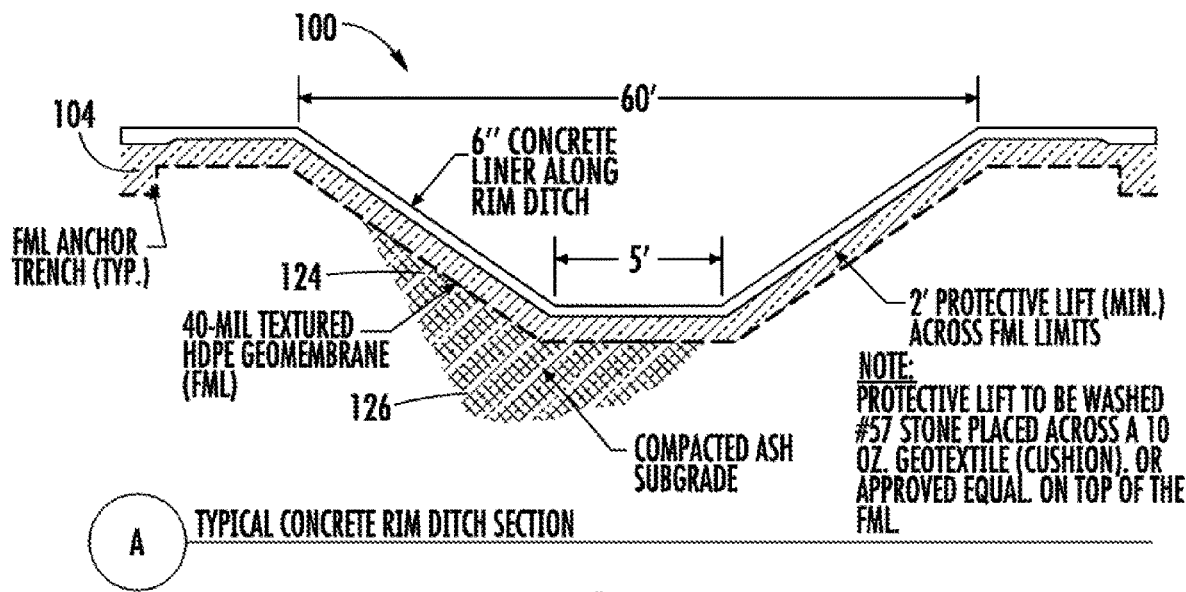
Figure 3:
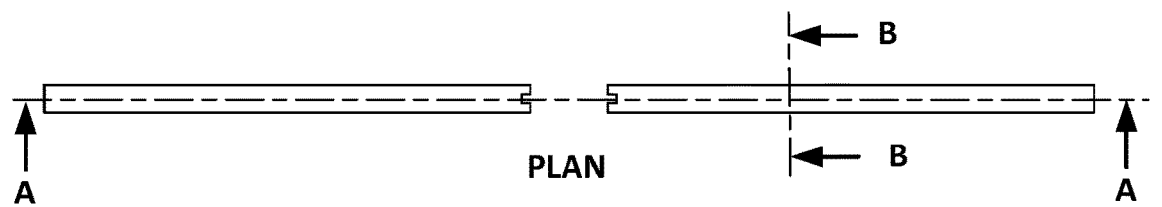
Figure 3:
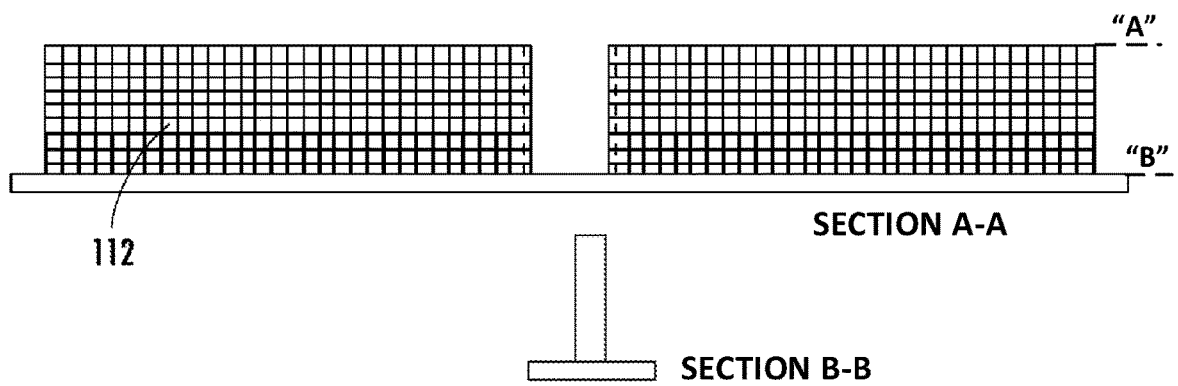
Figure 3:
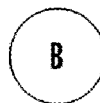
Figure 4:
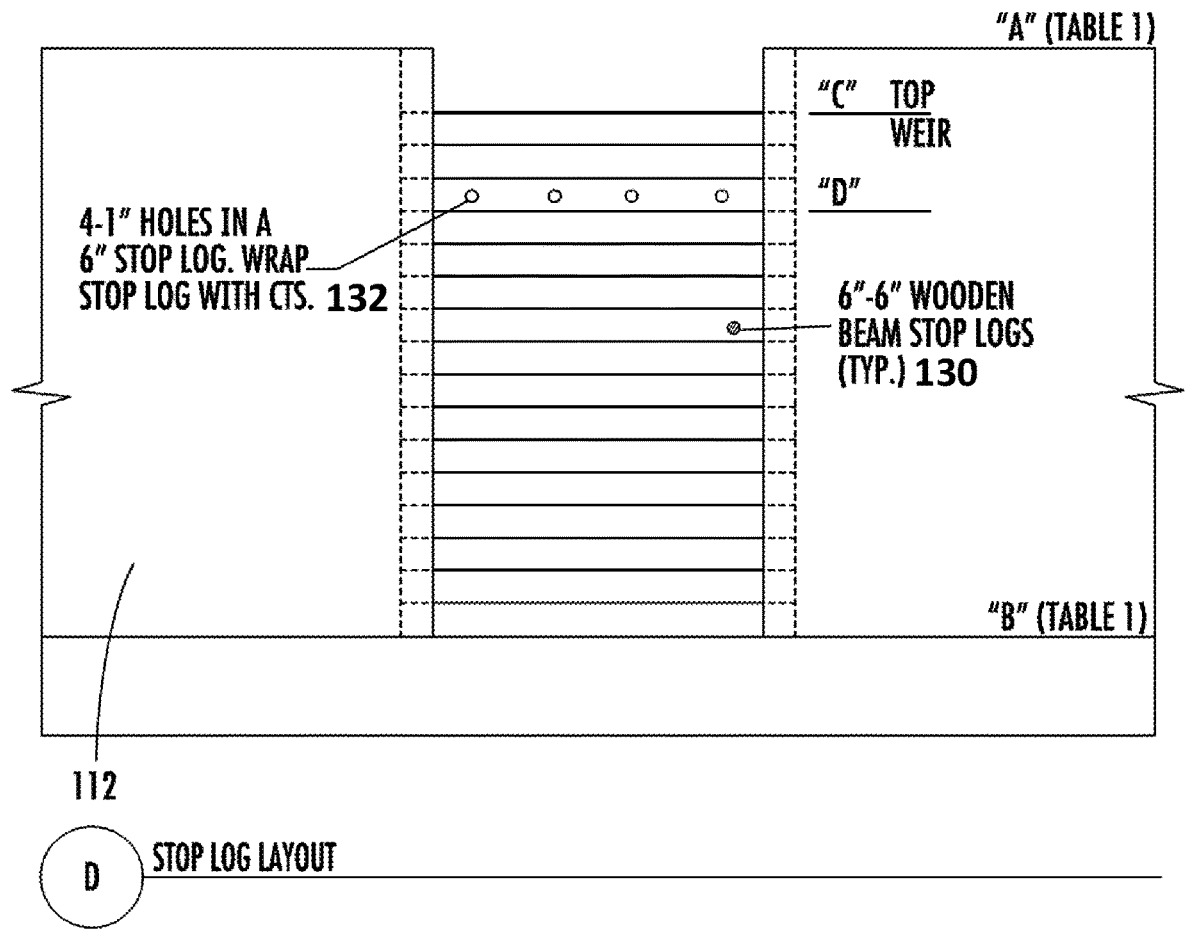
Figure 5:
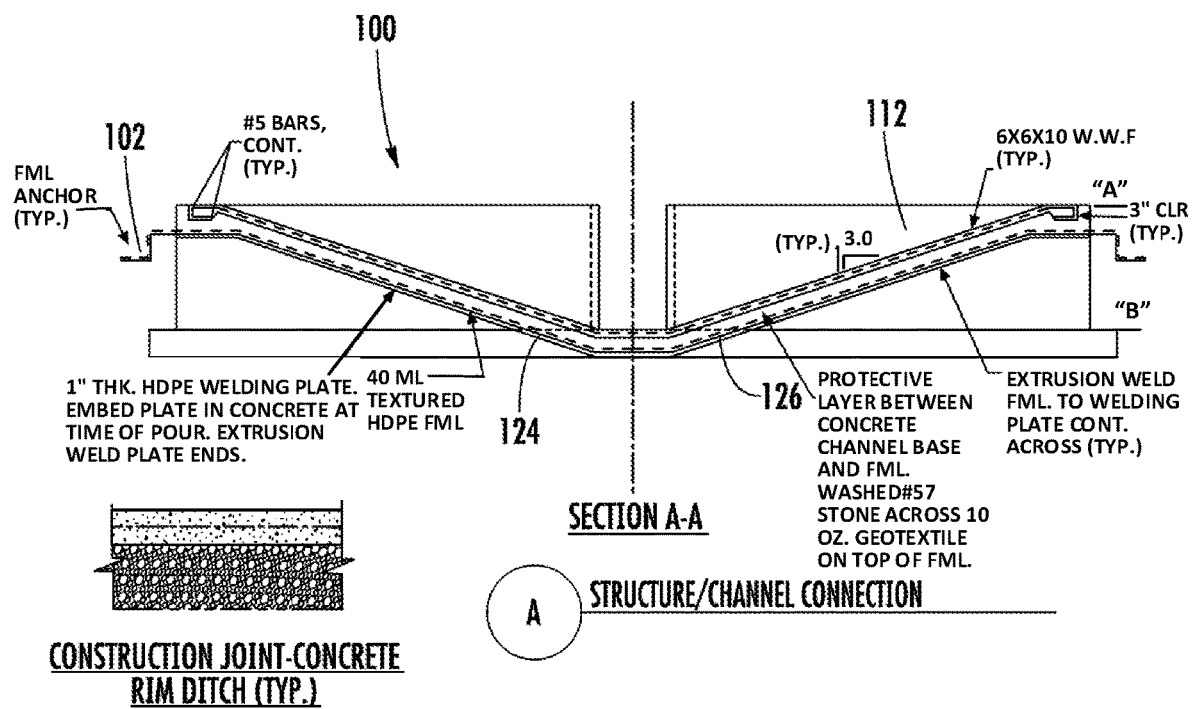
Figure 6:
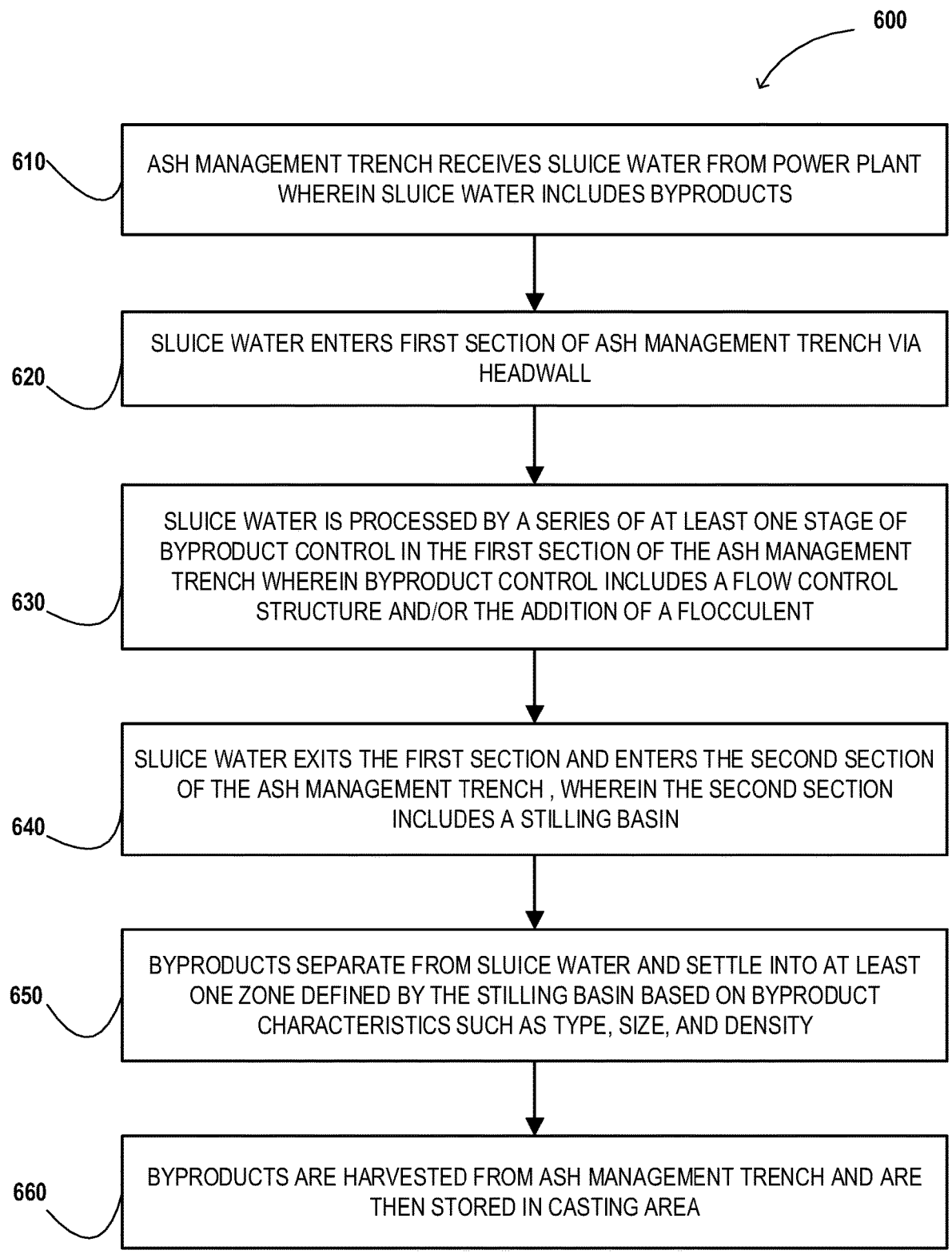

Having thus described embodiments of the invention in general terms, reference will now be made to the accompanying drawings, where:

FIG. 1 illustrates an exemplary aerial view of the ash management trench, in accordance with one embodiment of the invention;

FIG. 2 illustrates a cross-sectional view of the ash management trench, in accordance with one embodiment of the invention;

FIG. 3 illustrates a frontal view of the flow control structure of the ash management trench, in accordance with one embodiment of the invention;

FIG. 4 illustrates a frontal view of the stop log layout, in accordance with one embodiment of the invention;

FIG. 5 illustrates a connective element of the ash management trench, in accordance with one embodiment of the invention; and FIG. 6 illustrates a process flow describing how elements of the ash management trench process sluice water.

DETAILED DESCRIPTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As used herein, "byproducts" may refer to ash, coal combustion products (CCBs), sediment, suspended solids, waste particles, or the like. These terms may refer to one another and may be used interchangeably throughout.

Production of steam at a power plant may require the burning of a fuel, such as coal. Burning coal may generate byproducts that are to be exhausted from the power plant in accordance with environmental laws and design constraints. In some embodiments, these byproducts may be recycled, repackaged, and/or sold for reuse. Thus, there is a need for a system that processes byproducts in an efficient and safe manner.

The present invention may include an ash management trench 100 for processing byproducts found in sluice water (e.g., discharge water from a power plant). Typically, processing byproducts includes receiving sluice water from the power plant, allowing byproducts in the sluice water to separate and settle, and then extracting the byproducts from the sluice water. Ultimately, the objective of the ash management trench 100 may be to provide means of effectively harvesting byproducts from sluice water for reuse. An exemplary aerial layout of the ash management trench 100 is depicted in FIG. 1.

Installation of the ash management trench 100 may include excavation of the surrounding grounds. The excavated grounds may be repurposed to construct a separator dam 102 that surrounds the ash management trench 100. FIG. 1 shows that the separator dam 102 may protect the contents of the ash management trench 100 from impacting any surrounding areas. In some embodiments, the ash management trench 100 may be permanently coupled to the ground via a coupling 104, as shown in FIG. 2. The coupling 104 may include an anchor, a joint, a concrete footing, or the like.

The ash management trench 100 may be constructed and/or lined with concrete, cement, or a similar solid material to allow for the effective processing of byproducts without impacting the underlying subgrade. The construction material may be installed using a waterstop, a sealant, a caulk filling, or the like to ensure a watertight installation and thus mitigating any escape of sluice water from the ash management trench 100.

The ash management trench 100 may define a plurality of sections. In some embodiments, the ash management trench 100 may define a first section 106 and a second section 108. As displayed in FIG. 1, the first section 106 and the second section 108 are typically coupled together in series so as to allow the sluice water to flow through the first section 106 and then into the second section 108. Alternatively, the first section 106 and the second section 108 may be coupled together in parallel, or in another configuration.

The first section 106 of the ash management trench 100 may define a headwall 110 through which the sluice water discharge from the power plant may enter the ash management trench 106. In some embodiments, the headwall 110 may include a hole, a cavity, or similar opening through which a discharge pipe or canal transporting the sluice water discharge may run. The headwall 110 may be cast in place using a solid material such as concrete, cement, a plastic, a metal, or the like.

Following the headwall 110, the first section 106 may define a first length, a first width, a first depth, or a first volume as seen in FIG. 2. The first section 106 may be embody a rim ditch or a receiving channel constructed with sufficient dimensions to provide the time and storage needed to capture byproducts that are traveling within received sluice water. Additionally, the first section 106 may incorporate adequate storage volume to account for rainfall events and other runoff sources.

The first section 106 of the ash management trench 100 may also define at least one stage of byproduct control. Multiple stages of byproduct control may be coupled to the first section 106 and arranged in series (or in another configuration) along the first length of the first section 106 as to allow for multiple controls of the flowing sluice water. Typically, the first section 106 of the ash management trench 100 includes three stages of byproduct control, wherein each stage of byproduct control includes a flow control structure (FCS) 112. Different stages of byproduct control may be configured to capture specific or multiple types of byproducts at different points throughout the ash management trench 100.

The FCS 112 shown in FIG. 3 may include a solid concrete wall, a metal mesh screen, a hydraulic gate, a sluice, or similar barrier that provides the ability to "throttle" the flow or control the surface depth of the sluice water. For example, the FCS 112 depicted in FIG. 4 may control the sluice water surface depth by stacking "stop logs" 130 as needed to control byproduct storage volume within any given stage of the first section 106. The stop logs 130 may include holes 132, perforations, or the like to provide the desired control of the sluice water. Each FCS 112 may be configured to capture a particular byproduct based on byproduct characteristics such as particle type, size, or density.

In some embodiments, a flocculant (a chemical agent, a catalytic compound, or the like that promotes the binding of similar particles) may be added to the received sluice water at the headwall 110 location and/or at FCS 112 locations. The purpose of adding the flocculant to the sluice water may be to accelerate the separation and settling of solids in the sluice water. The flocculant may interact well with byproducts, may bind them together, and may maintain the binding effects in turbulent flow conditions as they are carried through the ash management trench 100. Typically, the flocculant is operable over a broad power-of-hydrogen (pH) range so that it may induce separation and settling of a wide variety of solids in the received sluice water. Additionally, a plurality of flocculants may be added into the received sluice water at various locations along the ash management trench 100, in various dosages, and at various dosage or discharge rates. In this way, each flocculant added to the sluice water is configured to be compatible and synergistic when used in combination with other flocculants or compounds added to the sluice water. The addition of multiple flocculants and/or compounds enables quicker separation and settling of different types of solids in the sluice water (e.g., heavy metals, aluminum, or the like). The dosage rate of addition of each flocculant or compound may depend on the constituent level and type (e.g., an amount and type of solid waste) found in the received sluice water.

In some embodiments, the flocculant may include an aluminum-based coagulant. For example, the flocculant may include aluminum sulfate, polyaluminum chloride, aluminum chlorohydrate, polyaluminum chlorohydrate, or another aluminum-based coagulant. Typically, only one aluminum-based coagulant is added as a flocculant to the sluice water along the length of the ash management trench 100, but in other embodiments, multiple aluminum-based coagulants may be added to the sluice water at various locations along the length of the ash management trench 100. The aluminum-based coagulant can be in the form of a powder, a granular, a liquid, or an aqueous mixture. A typical dosage of an aluminum-based coagulant that is added to the sluice water lies within in a range of 5 mg/L to 75 mg/L and, in a preferred embodiment, the dosage of an aluminum-based coagulant lies within a range of 10 mg/L to 15 mg/L.

In other embodiments, the flocculant may include a polymer flocculant. The polymer flocculant may further be described as a polyacrylamide or a linear anionic polyacrylamide. In this way, the polymer flocculant may have a broad range of anionic charge as well as a broad range of molecular weight. The anionic charge and molecular weight of the polymer flocculant may be determined based on the contents of the sluice water (e.g., the solid or constituent types and amounts). The polymer flocculant can be in the form of a powder, a granular, an emulsion, a liquid, a water-based solution, or an aqueous mixture. A typical dosage of a polymer flocculant that is added to the sluice water lies within in a range of 5 mg/L to 75 mg/L and, in a preferred embodiment, the dosage of an aluminum-based coagulant lies within a range of 10 mg/L to 15 mg/L.

To treat and/or remove metals or heavy metals in the sluice water, the flocculant may include a metal chelate. Typically, the metal chelate is added to the sluice water in combination with coagulants and flocculants as described above. The metal chelate (or heavy metal chelate) may include a variety of products or compounds, including but not limited to dithiocarbamate groups, polyethyleneimine dithiocarbamate groups, polymer products containing dithiocarbamate groups, or the like. A typical dosage of metal chelate that is added to the sluice water lies within in a range of 4 mg/L to 100 mg/L, the range being dependent on levels of heavy metals to remove.

An oxidation step is often necessary prior to metals removal. Thus, an oxidizer may also be added to a flocculant mixture or to the sluice water for treatment of metals. For example, well-known oxidizers such as hydrogen peroxide, potassium permanganate, chlorine dioxide may be added to the sluice water. A dosage rate of oxidizer that is added to the sluice water is dependent on levels of heavy metals to remove, as well as any other solids or constituents in the sluice water. Oxidizer is typically added prior to the addition of metal chelating products, if such products are required.

In some embodiments, the flocculant may include an anionic polyacrylamide flocculant. In other embodiments, the flocculant may include another compound.

The flocculant (either the same flocculant or a different flocculant, or another compound such as a coagulant, a flocculant polymer, a metal chelate, or oxidizer) may be added to the sluice water at any stage or multiple times throughout the ash management trench 100. For example, the ash management trench 100 may include one or more devices to conveying the flocculant (or a flocculant mixture) so that the flocculant is added to the received sluice water at predetermined time intervals and/or in predetermined quantities. In one embodiment, such a device comprises a one or more metered pumps installed at multiple locations along the length of the ash management trench 100 configured to control discharge of the flocculant (or a flocculant mixture) so that the flocculant is added to the received sluice water at predetermined time intervals and/or in predetermined quantities. The one or more metered pumps may be adjacently or operatively coupled to the ash management trench 100 at the headwall 110, at one or more FCS 112 locations, at the first section 106 or the second section 108, at the stilling basin 114, or at another location. The metered pumps may be computer-programmable, or integrated with an existing electronic computing system that enables a user to configure the metered pumps to discharge the flocculant at desired predetermined time intervals and in various quantities. In this way, the addition of flocculant to the received sluice water may be controlled by a predetermined application rate of flow over a predetermined period of time and at predetermined locations along the length of the ash management trench 100.

One or more lines, pipes, drains, tanks, or similar transport means (e.g., PVC pipes, copper pipes, or the like) are typically employed to carry, hold, transport, recycle, and/or discharge the flocculant into the ash management trench 100. These lines may be operatively coupled to the one or more metered pumps (or other flocculant discharge device) so as to create a flocculant discharge system. In this way, flocculant flows, drips, or is mechanically discharged from the pipes of the flocculant discharge system and into the ash management trench 100. In some embodiments, the flocculant discharge system may be operatively and/or adjacently coupled to the ash management trench 100, or located offsite. The flocculant discharge system may include a series of tanks, lines, pipes, and pumps that are configured to store, transport, discharge flocculant (and perhaps later receive discharged flocculant from settling sluice water for recycling purposes) according to a predetermined application rate over a predetermined period of time. Alternatively, a powder flocculant may be added to the sluice water in the ash management trench 100 by a hopper and auger feed system, or pumped or gravity-fed from a bulk container of flocculent.

The flocculant discharge system may be positioned wholly above ground, partially above ground and partially below ground, or wholly below ground. Positioning the flocculant discharge system wholly above ground may be the most cost-effective means for installing the flocculant discharge system and further provides easy access for maintenance of the flocculant discharge system. However, a wholly above-ground flocculant discharge system may be susceptible to harsh weather elements, such as drastically fluctuating temperatures. For example, during winter months, above-ground pipes of the flocculant discharge system may be exposed to freezing temperatures, which can cause flocculant in the above-ground pipes of the flocculant discharge system to freeze (depending on the composition of the flocculant).

To combat potentially harsh weather conditions, the flocculant discharge system can be positioned at least partially below ground. For example, the one or more metered pumps that discharge flocculant into the received sluice water of the ash management trench 100 may be positioned above ground, while pipes, tanks, or other elements of the flocculant discharge system that carry and/or store flocculant may be buried below ground. Positioning pipes of the flocculant discharge system below ground insulates the pipes and can prevent the flocculant contained within the pipes from freezing. Pipes of the flocculant discharge system may be buried below ground at predetermined depths so as to maximize insulatory properties of the ground surrounding the buried pipes.

Additional or alternative thermal insulation measures may be employed by the flocculant discharge system. For example, the flocculant may be heated as it passes through a supplemental heating apparatus (e.g., a heating pump). In some embodiments, an additive that has a much lower freezing point may be added to the flocculant to keep the flocculant mixture from freezing when exposed to temperatures at which the flocculant typically freezes. In other embodiments, lines or pipes of the flocculant discharge system may be insulated with rubber, plastic, insulation, or a thermal dressing. In yet another embodiment, fluid that has been heated (e.g., water or steam) can be recirculated through piping that runs along or within the piping for the flocculant to keep the flocculant mixture from freezing. For example, a pump with a heater or in operable communication with a heated fluid reservoir can be used to circulate the fluid.

The flocculant discharge system may further include below-ground means for discharging flocculant into the received sluice water of the ash management trench 100. Spray nozzles may be operatively coupled to lines or pipes of the flocculant discharge system so that the flocculant may be discharged through the spray nozzles and into the received sluice water of the ash management trench 100. For example, pipes and spray nozzles are installed in the concrete of the ash management trench 100 so that only the spray nozzle itself is exposed to the ash management trench 100 when flocculant is discharged from the flocculant discharge system. In other embodiments, the flocculant discharge system may include one or more screening stations (e.g., totes stations) configured to intake received sluice water, discharge flocculant into the received sluice water, and then discharge the flocculant-sluice water mixture back into the ash management trench 100 for further processing.

Flocculant may further be added to the received sluice water of the ash management trench 100 by opening a valve, which may be operated manually or may comprise a computer-controlled valve, or the like. The flocculant may also be added to the received sluice water of the ash management trench 100 as a dissolvable solid. For example, the flocculant may be mixed with a dissolvable solid that can then be discharged into the received sluice water. The solid dissolves, discharges the flocculant into the received sluice water, and thus allows the flocculant to diffuse throughout the received sluice water.

The sluice water typically flows downstream in the direction of the first length the first section 106. The first section 106 may be sloped, elevated, or tiered as to enable a continuous flow of sluice water throughout the first section 106 and its associated series of stages of byproduct control. A pipe, a drain, or a pump may be installed along the first section 106 for collecting or redirecting sluice water. The first section 106 may be constructed out of a solid material such as concrete, cement, brick steel, or the like. In some embodiments, the first section's 106 construction materials may be lined with a roughly-textured surface to better capture byproducts, a smoothly-textured surface as to allow for an uninhibited flow of the sluice waters, or a combination of rough and smooth surface textures.

The second section 108 of the ash management trench 100 may be adjacently coupled to the first section 106, and sluice water may flow from the first section 106 into the second section 108. FIG. 5 depicts an exemplary connection structure between two sections. In some embodiments, the velocity of the flowing sluice water may slow as the sluice water enters the second section 108.

Typically, the second section 108 of the ash management trench 100 defines a stilling basin 114. As FIG. 1 shows, the stilling basin 114 may include a relatively wide surface area which may allow for the timely separation and settling of byproducts in the sluice water. Once settled and separated by particle size, type, density, or the like, the byproducts may be extracted from the stilling basin 114 for reuse.

In some embodiments, the second section 108 may define at least one zone within the stilling basin 114. Typically, the stilling basin 114 defines three zones—an inlet zone 116, a settling zone 118, and a sludge zone 120—coupled together in series as depicted in FIG. 1. In alternative embodiments, multiple zones may be coupled in parallel to one another, or in a different configuration altogether.

The inlet zone 116 may receive the sluice water from the first section 106 of the ash management trench 100. The inlet zone 116 may be adjacently coupled to and/or in series with the first section 106. While the byproducts in the sluice water may begin to separate and settle in the inlet zone 116, the main purpose of the inlet zone 116 may be to channel the sluice water into the stilling basin 114.

The settling zone 118 may be adjacently coupled to and/or in series with the inlet zone 116. The settling zone 118 may include at least one stage of byproduct control wherein byproducts of varying size, density, or type may separate and settle. The velocity of the sluice water flow may be controlled in the settling zone 118 via an FCS 112 or similar controlling apparatus to allow for the adequate separation and settling of the byproducts.

The sludge zone 120 typically adjacently coupled to and/or in series with the settling zone 118 may be positioned at the end of the series of elements included in the ash management trench 100. Quiescent flow conditions may occur in the sludge zone 120 which may enable the lightest of byproducts to separate from the sluice water and settle.

The second section 108 may be sloped, elevated, or tiered as to enable the timely separation and settling of various byproducts in the sluice waters. The second section 108 and its associated zones may be constructed out of a solid material such as concrete, cement, steel, or the like. A pipe, a drain, or a pump may be installed throughout the second section 108 to collect or redirect sluice water or byproducts. In some embodiments, the second section's 108 construction materials may be lined with a textured coating to better capture byproducts. In some embodiments, the second section's 108 construction materials may be lined with a roughly-textured surface to better capture byproducts, a smoothly-textured surface as to allow for an uninhibited flow of the sluice waters, or a combination of rough and smooth surface textures. Additionally, the second section 108 may incorporate adequate storage volume to account for the received sluice water, rainfall events, and other runoff sources.

Pictured in FIG. 1, a casting area 122 may be included in the ash management trench 100. The casting area 122 may be adjacently coupled to the first section 106, the second section 108, or positioned offsite. The casting area 122 may be designed to receive and/or store excavated byproducts. As the excavated byproducts dry out, they may produce a decant flow of leachate (liquid or water containing traces of byproducts). The casting area's 122 purpose may be to capture the decant flow from the byproducts for proper discharge of the leachate. The leachate may be collected via a pipe, a drain, or a pump in the casting area 122 so that the leachate does not seep into the surrounding areas and cause potential harm to the environment.

To further protect the surrounding areas, including the natural soil subgrade and the groundwater table, a liner system may be installed along the limits of the ash management trench 100. In some embodiments, a flexible high density polyethylene membrane liner (FML) 124 may be installed along the limits of the first section 106, the second section 108, the casting area 122, or a combination of the ash management trench's 100 elements. Depicted in FIGS. 2 and 5, the FML 124 may serve as a barrier that separates any sluice water from the subgrade and groundwater surface. Moreover, a geotextile cushion or washed stone layer 126 (also seen in FIGS. 2 and 5) may be installed to protect the FML 124 along the limits of the ash management trench 100. This additional layer of protection may ensure that any sluice water seepage is captured within the stone layer 126 and does not harm the surrounding areas.

Settled byproducts may be harvested from the first section 106 or the second section 108 and transported to the casting area 122 for drying and/or storage. An excavator bucket may be used to harvest the settled byproducts from the ash management trench 100. The excavator bucket may be coupled to a tractor, a bulldozer, or similar piece of machinery. To minimize the damage done to the ash management trench 100 during byproduct excavation, the excavator bucket may utilize a protective cushion or bumper along the scooping edge of the excavator bucket.

FIG. 6 is a block diagram 600 that illustrates the flow of sluice water through the ash management trench. At block 610, the ash management trench 100 receives sluice water from the power plant, wherein the sluice water includes byproducts. At block 620, the sluice water enters the first section 106 of the ash management trench 100 via the headwall 110. At block 630, the sluice water is processed by a series of at least one stage of byproduct control in the first section 106 of the ash management trench 100 wherein byproduct control includes a flow control structure (FCS) 112 and/or the addition of a flocculant. At block 640, sluice water exits the first section 106 and enters the second section 108 of the ash management trench 100, wherein the second section 108 includes a stilling basin 114. At block 650, byproducts separate from the sluice water and settle into at least one zone defined by the stilling basin 114 (the inlet zone 116, the settling zone 118, and the sludge zone 120) based on byproduct characteristics such as type, size and density. At block 660, byproducts are harvested from the ash management trench 100 and are stored in the casting area 106.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

What is claimed is:

1. An ash management trench system for harvesting byproducts, the system comprising:
    a first section comprising at least one flow control structure to capture a predetermined first byproduct; and
    a second section comprising a stilling basin, the second section being coupled to the first section, wherein the stilling basin is structured for separation and settling of a predetermined second byproduct;
    wherein the at least one flow control structure comprises a mesh screen, having a plurality of apertures of a predetermined dimension so as to prevent the predetermined first byproduct with a dimension greater than the predetermined dimension from passing through the at least one flow control structure;
    wherein the first section comprises at least one flocculant discharger configured to release one or more flocculants into the first section at a predetermined application rate of flow and at predetermined time intervals, wherein the at least one flocculant discharger is positioned at least partially below ground and wherein the at least one flocculant discharger comprises a supplemental heating apparatus to impede freezing of the one or more flocculants, wherein the at least one the flocculant discharger comprises a metered pump, and wherein the at least one flocculant discharger discharges flocculant at multiple locations along the length of the first section; and
    a casting area, wherein the casting area is structured to store excavated predetermined first and second byproducts received from the first section or the second section.

2. The system of claim 1 further comprises a separator dam.

3. The system of claim 1 further comprises a geotextile layer.

4. The system of claim 1, wherein the first section is constructed out of a solid construction material, wherein the solid construction material is lined with at least one of a roughly-textured surface configured to capture byproducts and/or at least one smoothly-textured surface configured to allow uninhibited flow of sluice waters.

5. The system of claim 1 further comprises a flexible high density polyethylene membrane liner, wherein the flexible high density polyethylene membrane liner is installed along limits of at least one of the first section and the second section.

6. The system of claim 1, wherein the first section defines at least one of a length, a width, a surface area, a depth, or a volume, and wherein the predetermined first byproduct is the same as the predetermined second byproduct.

7. The system of claim 1 further comprises at least one of a drain or a pipe, wherein the predetermined first byproduct and the predetermined second byproduct are different.

8. The system of claim 1, wherein the predetermined first byproduct comprises different particle sizes and/or particle densities, and/or the predetermined second byproduct comprises different particle sizes and/or particle densities.

9. The system of claim 1 is constructed with concrete.

10. The system of claim 1 is at least one of sloped, elevated, tiered, or inclined.

11. The system of claim 1, wherein the first section comprises a receiving channel.

12. The system of claim 1, wherein the first section comprises a headwall.

13. The system of claim 10, wherein the headwall comprises an opening for receiving sluice water.

14. The system of claim 1, wherein the one or more flocculants comprise a flocculant mixture comprising a catalytic compound, an aluminum-based coagulant, a polymer flocculant, a metal chelate, an oxidizer, or an anionic polyacrylamide.

15. The system of claim 1, wherein the predetermined first byproduct defines a predetermined particle type and/or a predetermined particle density, and wherein the at least one flow control structure is configured to capture the predetermined first byproduct based on the predetermined particle type and/or the predetermined particle density.

16. The system of claim 1, wherein the stilling basin defines at least one zone, the at least one zone comprising at least one designated area for ash settlement.

17. The system of claim 1 comprises the first section and the second section are coupled in series.

18. An ash management trench system for harvesting byproducts, the system comprising:
- a first section comprising at least one flow control structure to capture a predetermined first byproduct, the at least one flow control structure comprising at least one flocculant discharger configured to release one or more flocculants into the first section at a predetermined application rate of flow and at predetermined time intervals, wherein the at least one flocculant discharger is positioned at least partially below ground and wherein the at least one flocculant discharger comprises a supplemental heating apparatus to impede freezing of the one or more flocculants, wherein the at least one the flocculant discharger comprises a metered pump, and wherein the at least one flocculant discharger discharges flocculant at multiple locations along the length of the first section;
- a second section comprising a stilling basin, the second section being coupled to the first section in series, wherein the stilling basin is structured for separation and settling of a predetermined second byproduct;
- a casting area, the casting area comprising a collection drain;
- a protective geotextile layer adjacently coupled to the first section and the second section; and
- wherein the at least one flow control structure comprises a mesh screen, having a plurality of apertures of a predetermined dimension so as to prevent byproducts with a dimension greater than the predetermined dimension from passing through the at least one flow control structure.

19. An ash management trench method for harvesting byproducts, the method comprising:
- providing a first section comprising at least one flow control structure to capture a predetermined first byproduct, wherein the at least one flow control structure comprises a mesh screen having a plurality of apertures of a predetermined dimension so as to prevent the predetermined first byproduct with a dimension greater than the predetermined dimension from passing through the at least one flow control structure;
- providing a second section comprising a stilling basin, the second section being coupled to the first section, wherein the stilling basin is structured for separation and settling of a predetermined second byproduct; and
- transporting the settled predetermined first byproducts received from the first section and the predetermined second byproduct received from the second section to a casting area; and
- wherein the first section comprises at least one flocculant discharger configured to release one or more flocculants into the first section at a predetermined application rate of flow and at predetermined time intervals, wherein the at least one flocculant discharger is positioned at least partially below ground and wherein the at least one flocculant discharger comprises a supplemental heating apparatus to impede freezing of the one or more flocculants, wherein the at least one the flocculant discharger comprises a metered pump, and wherein the at least one flocculant discharger discharges flocculant at multiple locations along the length of the first section.

20. The method of claim 19, further comprising:
- receiving sluice water via a headwall in the first section, the sluice water comprising byproducts; and
- transporting the sluice water through the first section and into the second section via the at least one flow control structure, the second section enabling the settlement of the predetermined second byproduct.

21. The method of claim 20, wherein providing the second section further comprises providing the second section comprising the stilling basin, the second section being coupled to the first section in series.

* * * * *